United States Patent
Agrawal et al.

(10) Patent No.: US 12,013,831 B2
(45) Date of Patent: Jun. 18, 2024

(54) INDEX FOR MULTI-LEVEL DATA STRUCTURES

(71) Applicant: salesforce.com, inc., San Francisco, CA (US)

(72) Inventors: Rohit Agrawal, San Francisco, CA (US); Aditya Shetty, San Francisco, CA (US); Kaushal Mittal, Dublin, CA (US); Terry Chong, Pleasanton, CA (US); Thomas Fanghaenel, Oakland, CA (US); Vaibhav Arora, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 3 days.

(21) Appl. No.: 17/162,882

(22) Filed: Jan. 29, 2021

(65) Prior Publication Data

US 2022/0245113 A1    Aug. 4, 2022

(51) Int. Cl.
*G06F 16/22* (2019.01)

(52) U.S. Cl.
CPC .............................. *G06F 16/2264* (2019.01)

(58) Field of Classification Search
CPC .................................................. G06F 16/2264
See application file for complete search history.

(56) References Cited

U.S. PATENT DOCUMENTS

| | | | |
|---|---|---|---|
| 9,672,073 B2 | 6/2017 | Deschler et al. | |
| 10,496,283 B2* | 12/2019 | Waghulde | G06F 3/061 |
| 10,621,071 B2 | 4/2020 | Martin et al. | |
| 10,691,693 B2 | 6/2020 | Fanghaenel et al. | |
| 10,691,696 B2 | 6/2020 | Helland et al. | |
| 10,872,066 B2 | 12/2020 | Martin et al. | |
| 11,093,471 B2* | 8/2021 | Gupta | G06F 7/16 |
| 2010/0306222 A1* | 12/2010 | Freedman | G06F 16/9014 707/769 |
| 2015/0186453 A1 | 7/2015 | Agarwal et al. | |
| 2015/0261821 A1 | 9/2015 | Mittal et al. | |
| 2015/0261860 A1 | 9/2015 | Mittal et al. | |
| 2015/0261862 A1 | 9/2015 | Mittal et al. | |
| 2016/0147614 A1 | 5/2016 | Mittal et al. | |
| 2017/0192892 A1* | 7/2017 | Pundir | G06F 3/0644 |

(Continued)

*Primary Examiner* — Mark D Featherstone
*Assistant Examiner* — Ranjit P Doraiswamy
(74) *Attorney, Agent, or Firm* — Kowert, Hood, Munyon, Rankin & Goetzel, P.C.; Mark D. Seegers; Dean M. Munyon

(57) ABSTRACT

Techniques are disclosed relating to index metadata that is usable for accessing multi-level data structures. A computer system may operate a database, including maintaining a set of records having a set of corresponding keys. The computer system may create multi-level data structures that facilitate key range lookups against those records. A given multi-level data structure may store key information indicative of a subset of the corresponding keys. The computer system may create separate index metadata that is usable for accessing the multi-level data structures. The index metadata may specify indications of key information that is stored in the multi-level data structures and locations of the multi-level data structures. The computer system may perform a key range lookup that includes using the index metadata to determine a particular set of the multi-level data structures whose key information corresponds to a key range of the key range lookup.

14 Claims, 7 Drawing Sheets

(56) References Cited

U.S. PATENT DOCUMENTS

| | | |
|---|---|---|
| 2017/0269974 A1 | 9/2017 | Arora et al. |
| 2017/0329830 A1 | 11/2017 | Simitsis et al. |
| 2017/0329836 A1 | 11/2017 | Simitsis et al. |
| 2018/0218023 A1 | 8/2018 | Fanghaenel et al. |
| 2020/0097205 A1 | 3/2020 | Fanghaenel et al. |
| 2020/0097558 A1 | 3/2020 | Fanghaenel |
| 2020/0097573 A1 | 3/2020 | Fanghaenel et al. |
| 2020/0097581 A1 | 3/2020 | Chong et al. |
| 2020/0097583 A1 | 3/2020 | Fanghaenel |
| 2020/0250325 A1 | 8/2020 | Chong et al. |
| 2020/0409915 A1 | 12/2020 | Agrawal et al. |

\* cited by examiner

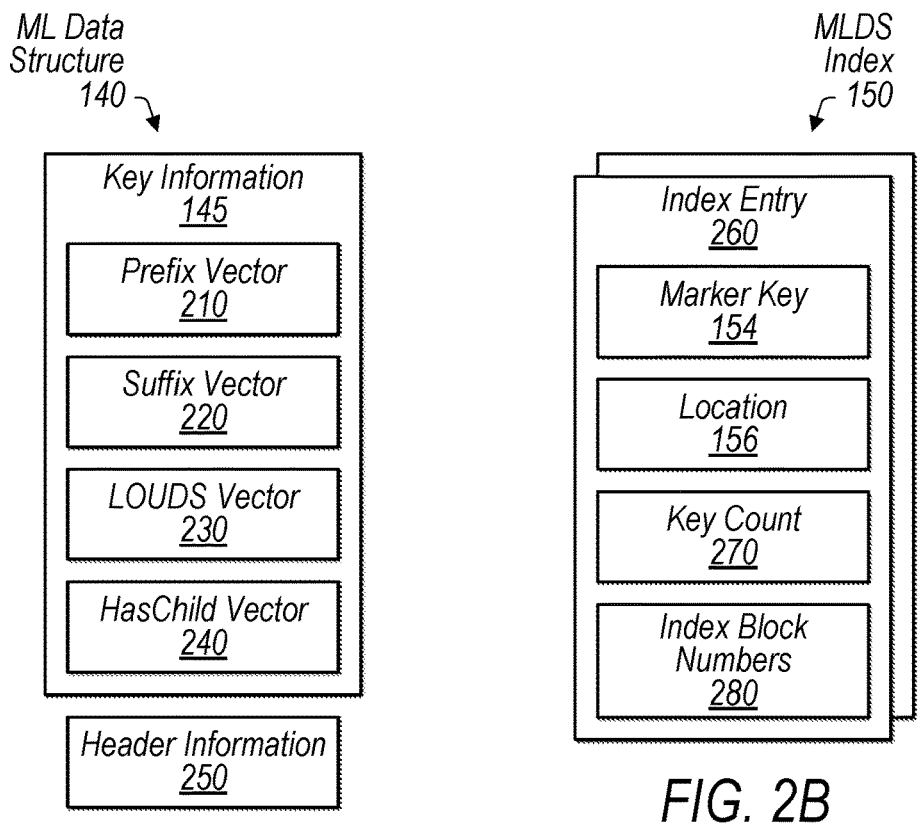
FIG. 2A
FIG. 2B
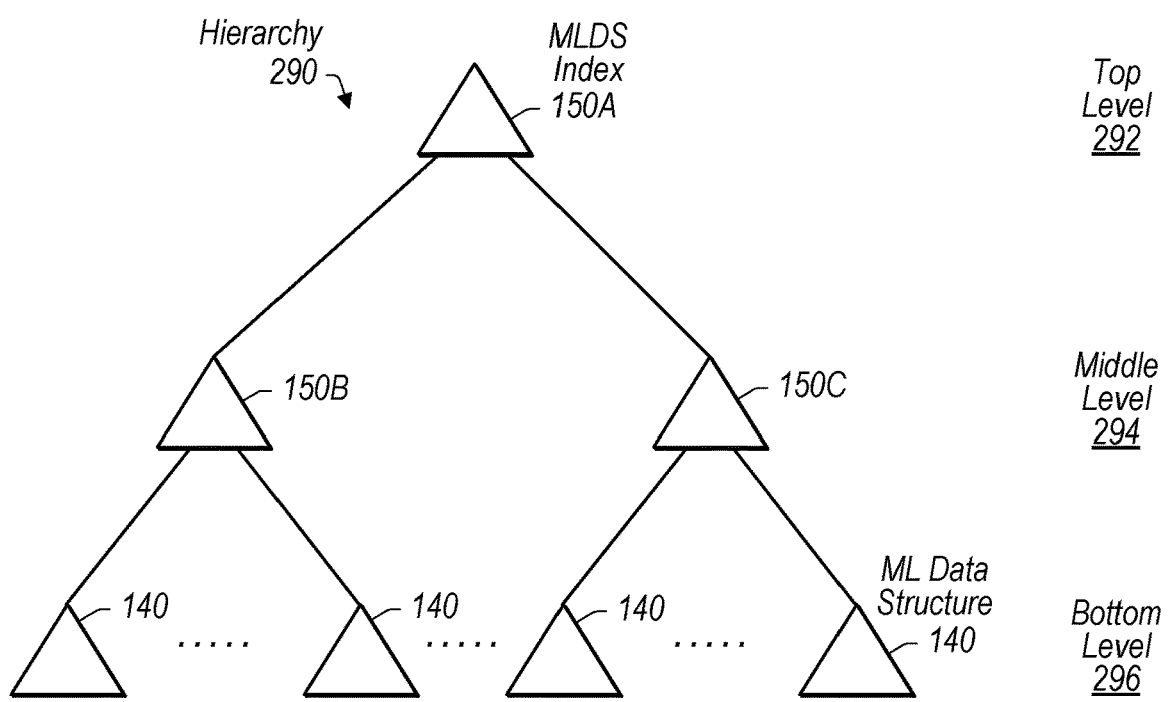
FIG. 2C

INDEX FOR MULTI-LEVEL DATA STRUCTURES

BACKGROUND

Technical Field

This disclosure relates generally to database systems and, more specifically, to creating and accessing multi-level data structures (e.g., tries) that store database key information.

Description of the Related Art

Modern database systems routinely implement management systems that enable users to store a collection of information in an organized manner that can be efficiently accessed and manipulated. In some cases, these database systems maintain a log-structured merge-tree (LSM tree) comprising multiple levels of files that each include database records storing information as key-value pairs. During operation, a database system receives requests to perform database transactions to manipulate and store information for the LSM tree. As such, those transactions can involve reading database records out of the LSM tree and writing new database records to new files in the LSM tree.

BRIEF DESCRIPTION OF THE DRAWINGS

FIG. 2A is a block diagram illustrating example elements of a multi-level data structure, according to some embodiments.

FIG. 2B is a block diagram illustrating example elements of a multi-level data structure index, according to some embodiments.

FIG. 2C is a block diagram illustrating example elements of a hierarchy of multi-level data structure indexes and multi-level data structures, according to some embodiments.

DETAILED DESCRIPTION

Figure 1:
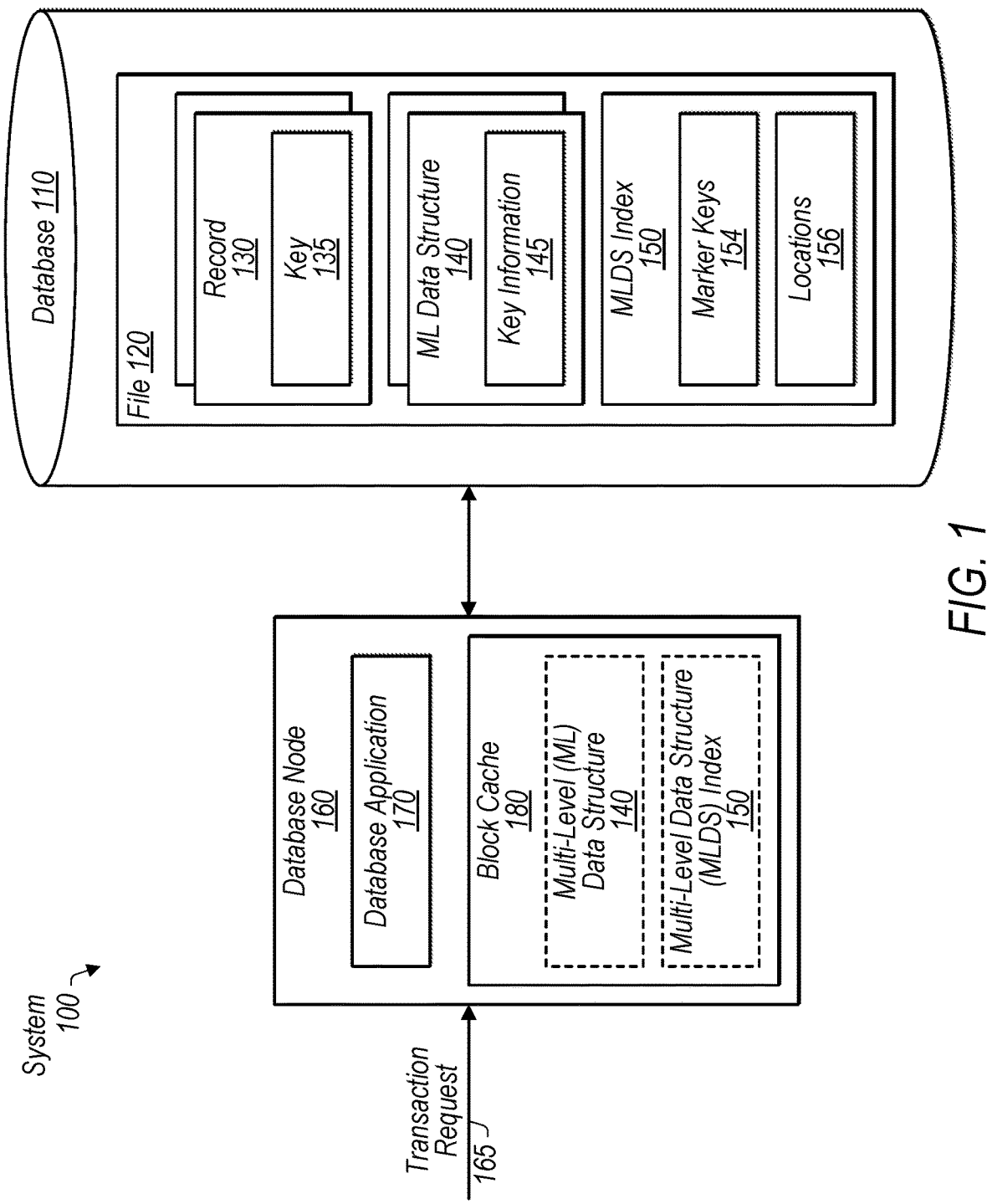
FIG. 1 is a block diagram illustrating example elements of a system that uses multi-level data structures and a multi-level data structure index, according to some embodiments.

When processing database transactions, a database system often reads database records from files maintained on a persistent storage. These files can be quite large in size (e.g., 2 GB) and thus can involve many resources (e.g., compute resources and time) being used to pull into a memory of the database system in order to be read. To reduce the number of files pulled from persistent storage, the database system can use a probabilistic data structure, such as a "trie" (or, a "trie data structure"), that indicates, for a given key range, whether a database record does not exist in a file, or, alternatively, whether a database record may exist in a file. Note that a probabilistic data structure is intended to definitively indicate that a record does not exist in a file, but only provides a possibility that a record may exist in a file. Use of a probabilistic data structure allows the database system to fetch records from only those files in which a database record may exist for a key range, and to skip those files in which a database record does not exist for that key range.

But in current implementations, tries have become quite large (e.g., 100 MB) relative to the size of a block cache (that is, a cache structure that caches blocks (e.g., 64 KB) of data) of the database system in which they can be temporarily cached while being used. When caching a trie in the block cache, the database system might have to evict a large, potentially useful portion of the block cache (e.g., 1600 blocks of 64 KB for a 100 MB trie) in order to make room for the trie. In many cases, however, only a few blocks of the trie are used to answer a key range query, especially for short key ranges. Accordingly, many blocks of the trie that are not useful for the key range query are cached at the cost of evicting blocks that are useful in other operations of the database system. The present disclosure addresses, among other things, this technical problem of evicting too many blocks in a block cache to make room for a trie.

The present disclosure describes various techniques for creating multiple independent multi-level (ML) data structures (e.g., tries) and a multi-level data structure (MLDS) index that can be used to access only those ML data structures that are relevant to answering a key range query. In various embodiments described below, a system includes a database and at least one database node that writes records to files at the database. As a part of writing out records, the database node inserts key information (e.g., keys in key-sorted order) about those records into a set of ML data structures of fixed size (e.g., one cache block) that are usable to determine if a corresponding file includes a record for a specified key or key range. In addition to creating those ML data structures, the database node creates a MLDS index that can store, among other information, a marker key (e.g., a start key) from each of the ML data structures. Accordingly, when performing a key range search, in various embodiments, the database node uses marker keys from the MLDS index in view of the search range to identify ML data structures (if any) to pull into its block cache. The database node may then fetch only those ML data structures and not the total amount of ML data structures stored for the file in order to determine if that file potentially includes a record for the search range. As an example, the database node may fetch a single, identified ML data structure into the block cache out of 1600 ML data structures maintained for the file.

Further optimizations for key range queries are discussed in the present disclosure. In various embodiments, an MLDS index stores record index block numbers for the index blocks that contain the first and last key inserted into each ML data structure. (An index block may identify the locations in a file where records are stored for corresponding keys.) Accordingly, if an ML data structure indicates that a file may include a record for a specified key range, then the database node may use the corresponding index block number(s) in order to jump directly to the relevant index block(s) instead of having to perform a search of the record index. Further, in some embodiments, Rank and Select (which are operations that may be used in traversing a LOUDS-based trie) may be computed and stored in the ML data structures to allow for quicker future traversal of those ML data structures.

These techniques may be advantageous over prior approaches as these techniques allow for tries to be cached in a block cache without having to evict a large portion of the block cache to make room for those tries. For example, these techniques can be used to create tries that are a single block in size and can enable the database system to answer a key range query using a few small tries instead of a large trie. As a result, when caching the few small tries, the database system may evict (if there is no available space) only a few potentially useful blocks of a block cache instead of 1600 useful blocks for a large 100 MB trie, for example. Moreover, by storing record index block numbers in the MLDS index and computed Rank and Select values in the ML data structures, the database system may more quickly and efficiently access records from a persistent storage. (As discussed farther below, Rank and Select values are values that enable a Level-Order Unary Degree Sequence (LOUDS)-based trie to be interpreted and traversed.) As an example, with the stored record index block numbers, the database system may not have to perform a search of the entire record index. An exemplary application of these techniques will now be discussed, starting with reference to FIG. 1.

Turning now to FIG. 1, a block diagram of a system 100 is shown. System 100 includes a set of components that may be implemented via hardware or a combination of hardware and software routines. In the illustrated embodiment, system 100 includes a database 110 (having files 120) and a database node 160. Also as shown, files 120 include: records 130 having keys 135; multi-level (ML) data structures 140 that includes key information 145; and a multi-level data structure (MLDS) index 150 that includes marker keys 154 and locations 156. As further shown, database node 160 includes a database application 170 and a block cache 180 capable of storing ML data structures 140 and MLDS indexes 150. In some embodiments, system 100 is implemented differently than shown. For example, ML data structures 140 and MLDS index 150 may be stored in separate locations from records 130 and thus not be included in files 120 having those records 130. As another example, system 100 may include a node cluster having multiple database nodes 160 that read and write data for system 100.

System 100, in various embodiments, implements a platform service (e.g., a customer relationship management (CRM) platform service) that allows users of that service to develop, run, and manage applications. System 100 may be a multi-tenant system that provides various functionality to multiple users/tenants hosted by the multi-tenant system, such as that described with respect to FIG. 7. Consequently, system 100 may execute software routines from various, different users (e.g., providers and tenants of system 100) as well as provide code, web pages, and other data to users, databases, and other entities associated with system 100. As illustrated, for example, system 100 includes a database node 160 that can store, manipulate, and retrieve data from files 120 of database 110 on behalf of users of system 100.

Database 110, in various embodiments, is a collection of information that is organized in a manner that allows for access, storage, and manipulation of that information. Accordingly, database 110 may include supporting software (e.g., storage servers) that allows for database node 160 to carry out operations (e.g., accessing, storing, etc.) on information that is stored at database 110. In some embodiments, database 110 may be implemented by a single or multiple storage devices connected together on a network (e.g., a storage attached network (SAN)) and configured to redundantly store information in order to prevent data loss. The storage devices may store data persistently and thus database 110 may serve as a persistent storage. In various embodiments, those storage devices implement a central storage that is shared among multiple database nodes 160 such that a record 130 written to a file 120 at database 110 by one of those database nodes 160 is accessible by the other database nodes 160.

Files 120, in various embodiments, include sets of database records 130. A record 130, in various embodiments, is a key-value pair comprising data and a corresponding key 135 that is usable to look up that record 130. For example, a record 130 may correspond to a data row in a database table where that record 130 specifies values for one or more fields of that database table. One or more of those values of that record 130 may serve as a key 135 for accessing that record from database 110—e.g., an organization ID value+ employee last name value may be used as a key 135 to lookup the corresponding employee record 130. A group of records 130 that have different keys 135 can form one or more key ranges for that group. Thus, in various embodiments, a file 120 is associated with one or more key ranges defined by the keys 135 of the records 130 included in that file 120. Consider an example in which a file 120 includes three records 130 associated with keys 135 "XYA", "XYW", and "XYZ", respectively. The three keys 135 span a key range of XYA→XYZ and, as a result, that file 120 is associated with the key range XYA→XYZ.

In some embodiments, files 120 are stored as a part of a log-structured merge tree (LSM tree) implemented at database 110. An LSM tree, in various embodiments, is a data structure that stores files 120 in an organized manner that uses a level-based scheme. The LSM tree may comprise two high-level components: an in-memory component implemented at an in-memory cache at database node 160 and an on-disk component that is implemented at database 110. In some instances, the in-memory cache is considered to be separate from the LSM tree. Database node 160 may initially write records 130 into its in-memory cache. As the cache becomes full and/or at certain points in time, database node 160 may flush records 130 to database 110. As a part of flushing the records 130, in various embodiments, database node 160 writes them into new files 120 at the top level of the LSM tree. Over time, files 120 are merged down through the levels of the LSM tree as newer files 120 are written to the top level. While the various techniques of this disclosure are discussed with respect to LSM trees, such techniques can be applied to other types of database implementations in which there are database nodes that can write and commit records for the database.

A multi-level (ML) data structure 140, in various embodiments, is a data structure that provides an indication on whether a file 120 potentially holds a record 130 for a particular key 135 or key range. For example, ML data structure 140 may be a trie that represents a tree-like data structure whose branches are made of linked nodes that correspond to character values of keys 135. Accordingly, a branch of the trie can represent a key 135 where the individual nodes of that branch correspond to the individual characters of that key 135. The branches of the trie may descend from a top level of the trie down many levels, where each node of a branch maps to a particular level. Thus, the trie forms a multi-level structure and, as a result, a data structure 140 can be viewed as a multi-level data structure. In various embodiments, database node 160 generates an ML data structure 140 when records 130 are written out to a file 120. That is, as those records 130 are being written to a file 120, database node 160 inserts key information 145 into an ML data structure 140 that is indicative of the keys 135 of those records 130. Key information 145 is discussed in greater detail with respect to FIG. 2A.

When database node 160 wishes to determine if a file 120 potentially includes certain records 130, database node 160 may perform a single or range key search against an ML data structure 140 to determine whether its key information 145 indicates the insertion of a key 135 corresponding to the search key/key range. If there exists such a key 135, then database node 160 may access records 130 of that file 120 in an attempt to locate any record 130 for the search key range. In various embodiments, an ML data structure 140 has a smaller memory footprint than the rest of its corresponding file 120. Consequently, database node 160 may more quickly and efficiently access an ML data structure 140 than accessing multiple or all records 130 of the corresponding file 120. As a result, using an ML data structure 140 to check for whether a file 120 potentially holds certain records 130 instead of directly accessing records 130 from that file 120 to check for those certain records 130 can provide a substantial performance boost to system 100.

MLDS index 150, in various embodiments, is a data structure having index metadata that enables database node 160 to identify and locate ML data structures 140 that are relevant to a key range search or a key range count. For example, a file 120 may include 1600 ML data structures 140. Accordingly, instead of accessing all of those ML data structures 140 for a key range search, database node 160 may identify, using MLDS index 150, a subset of the ML data structures 140 (e.g., two ML data structures 140) that are relevant to that key range search. As such, database node 160 may pull only the subset of ML data structures 140 from database 110 into its block cache 180. As shown, MLDS index 150 specifies marker keys 154 and locations 156. A marker key 154 may correspond to the start key 135 or the end key 135 associated with an ML data structure 140, and an associated location 156 may correspond to a memory address where that ML data structure 140 is stored. Consequently, database node 160 may use marker keys 154 to identify a set of ML data structures 140 and then use corresponding locations 156 to access those ML data structures 140. The index metadata is discussed in greater detail with respect to FIG. 2B.

Database node 160, in various embodiments, is hardware, software, or a combination thereof capable of providing database services, such as data storage, data retrieval, and/or data manipulation. These database services may be provided to other components in system 100 or to components that are external to system 100. As an example, database node 160 may receive a transaction request 165 from an application server (not depicted) to perform a transaction. A transaction, in various embodiments, is a logical unit of work (e.g., a specified set of database operations) to be performed in relation to database 110. For example, processing a transaction may include executing a SQL SELECT command to select one or more rows from one or more database tables. The contents of a row may be specified in a record 130 and thus a database node 160 may return one or more records 130 that correspond to the selected one or more table rows. In various cases, performing transaction may include a database node 160 writing one or more records 130 to an LSM tree.

Database application 170, in various embodiments, is a set of program instructions that are executable to manage database 110, including managing an LSM tree built around database 110. Accordingly, database application 170 may process transactions to read records from and write records to the LSM tree, as discussed. Database application 170 may maintain metadata that describes the structural layout of the LSM tree, including where files 120 are stored within database 110 and what records 130 may be included in those files 120. In various embodiments, that metadata includes ML data structures 140, MLDS index 150, and record index blocks that describe memory locations where corresponding records 130 are stored. Database application 170 may, when wishing to assess the contents of a file 120, pull that metadata into block cache 180 for use.

Block cache 180, in various embodiments, is a buffer that caches information in blocks in system memory (e.g., dynamic random access memory (DRAM)) of database node 160. A cache block may be of fixed size (e.g., 64 KBs) and include data blocks (e.g., a set of records 130) and metadata blocks (e.g., ML data structures 140, MLDS index 150, etc.). For example, an ML data structure 140 may fit within a single block and thus pulling that ML data structure 140 into block cache 180 consumes only one block of space. As a part of processing transaction requests 165, database application 170 retrieves blocks of information from database 110 and caches them in block cache 180. As block cache 180 becomes full, database application 170 may evict blocks from cache 180 according to any various known caching schemes in order to make room for incoming blocks. Database applications 170 and block cache 180 are discussed in more detail with respect to FIG. 3.

Turning now to FIG. 2A, a block diagram of an example ML data structure 140 is shown. In the illustrated embodiment, ML data structure 140 includes key information 145 and header information 250. As further shown, key information 145 includes a prefix vector 210, a suffix vector 220, a LOUDS vector 230, and a haschild vector 240. In some embodiments, ML data structure 140 is implemented differently than shown. For example, a portion of header information 250 may be separately stored as trailer information at the end of the metadata block that contains ML data structure 140.

As described, ML data structures 140 may be data structures that provide an indication on whether corresponding files 120 potentially hold records 130 for a specified key 135 or key range. Consequently, ML data structures 140 may serve as approximate range filters for a key value store, such as database 110 in some embodiments. As further previously described, ML data structures 140 may be generated when database node 160 writes out a corresponding set of records 130 to files 120. In various embodiments, records 130 are written out in key-sorted order and as a result, database node 160 has access to knowledge about previous and next keys 135 relative to a current key 135 that database node 160 is inserting into ML data structure 140.

With keys 135 being inserted in key-sorted order and with knowledge about the previous and next keys 135 relative to a current key 135, database node 160 may insert only a portion of the current key 135 into ML data structure 140. Particularly, when adding a key 135, in various embodiments, database node 160 calculates the minimum number of characters that need to be added to differentiate that key 135 from the previous key 135 and the next key 135. Database node 160 may calculate the minimum number of characters by determining the difference between the overlap of the current key 135 and the previous key 135 with the overlap of the current key 135 and the next key 135—the difference between overlaps being referred to as the "prefix" characters—and then adding one additional "suffix" character to differentiate the current key 135 from that next key 135. Those prefix and suffix characters may then be inserted into the appropriate vectors of ML data structure 140.

Prefix vector 210, in various embodiments, is a data structure that stores information identifying the prefix characters selected for each key 135 inserted into ML data structure 140. In some embodiments, each prefix character may be encoded using a particular implementation of a Level-Order Unary Degree Sequence (LOUDS) encoding scheme, referred to as "LOUDS-Sparse." LOUDS is a known scheme in which the structure of a tree is encoded in breadth-first order as a sequence of bits (each node's degree is encoded using the unary code), where access operations are defined in terms of Rank and Select. As an example, a root node that has three children can be encoded as "1110." The particular implementation LOUDS-Sparse encodes a node of a tree using a defined number of bytes or bit-sequences. For this present disclosure, a prefix character may be encoded using a byte for the character+1 LOUDS bit+1 haschild bit. In various embodiments, the encoded prefix character byte is stored in prefix vector 210, the LOUDS bit is stored in LOUDS vector 230, and the haschild bit is stored in haschild vector 240.

In some embodiments, prefix vector 210 is a vector of nodes, where each node indicates the characters that branch from that node. As an example, if the keys 135 "MAP," "TOE," and "TOP" are inserted into ML data structure 140, the root node may store a prefix character byte for "M" and a prefix character byte for "T." The node that connects to the root node through the branch representing "T" may store a prefix character byte for "O" (as "O" branches from "T" in "TOE" and "TOP"). In some embodiments, prefix vector 210 is a vector of level vectors in which each level vector corresponds to a level of ML data structure 140. When inserting a prefix character byte into prefix vector 210, database node 160 may determine which level that the prefix character corresponds to and then append an entry having the prefix character byte to the corresponding level vector. Consider an example in which the previously inserted key 135 is "ROAM," the current key 135 is "ROOK," and the next key 135 is "ROOT." Because "RO" has been inserted as a result of the previous key 135, database node 160 determines that the prefix character to be added for the current key 135 is "O" because it is the difference between the overlap of the previous key 135 and the current key 135 with the overlap of the current key 135 and the next key 135 (difference between "RO" and "ROO"). For the example, the suffix character is "K" as it differentiates the current key from the next key. Accordingly, database node 160 may append an entry for prefix character "O" to the third level vector (as that prefix character corresponds to the third position of that key 135).

Suffix vector 220, in various embodiments, is a data structure that stores information identifying the suffix characters selected for each key 135 inserted into ML data structure 140. In various embodiments, a suffix character is encoded using a K+2 bits for the character, where K is the number of suffix bits stored for each suffix character. The number of bits for the suffix character may be tunable and control the false positive rate for the lookups that are performed against ML data structure 140. That is, the number of bits for the suffix character is a tradeoff between space used for ML data structure 140 and the false positive rate for the lookups. Like prefix vector 210, in some embodiments, suffix vector 220 is a vector of nodes while in other embodiments, suffix vector 220 is vector of level vectors that form a multi-level data structure. Continuing the previous example, database node 160 may append an entry for suffix character "K" to the fourth level vector (as that suffix character corresponds to the fourth position of the current key 135).

LOUDS vector 230, in various embodiments, is a data structure that stores information that denotes node boundaries: if a character is the first in a node, its corresponding LOUDS bit is set. For example, if the root node stores character bytes for "M" and "T" and M is the first character stored in the root node, then its corresponding LOUDS bit is set while T's is not. In various embodiments, haschild vector 240 is a data structure that stores information indicating whether a given character/node has any children. That is, for a given node, a bit may be stored that indicates whether other nodes branch off (into lower levels) from that given node. As an example, a node that stores the character "O" from the key 135 "ROAM" has its haschild bit set to indicate that the node has a child (e.g., a node that stores the character "A").

Header information 250, in various embodiments, includes information that describes ML data structure 140 and assists in traversing ML data structure 140. In some embodiments, header information 250 identifies the number of nodes stored in ML data structure 140 and the number of prefix characters stored in ML data structure 140. Header information 250 may also store precomputed ranks and selects (e.g., ranks and selects for LOUDS vector 230, ranks and selects for haschild vector 240, etc.). Particularly, navigating a tree encoded with LOUDS-Sparse uses rank and select. Rank(i) counts the number of 1's (or 0's) up to position i, while select(i) returns the position of the i-th 1 (or 0 if a select for 0 is used instead of a select for 1). Accordingly, in various embodiments, rank and select are calculated for various i's and the resulting values are then stored in header information 250. By precomputing rank and select, a trie structure of keys 135, which may be represented by ML data structure 140, can be more quickly traversed as database node 160 does not have to compute the ranks and selects for the traversal at the point of traversal. That is, database node 160 can compute rank and select when ML data structure 140 is being generated instead of when the vectors of ML data structure 140 are being traversed.

In some embodiments, header information 250 may store offsets that correspond to the starting positions of each of those four vectors of ML data structure 140. Alternatively, header information 250 may store addresses instead of offsets. Accordingly, database node 160 may use the offsets (or addresses) to more quickly reach the appropriate vectors. Also, in various embodiments, ML data structure 140 is of fixed size (e.g., 64 KB) and once ML data structure 140 is full (or almost full), database node 160 may start a new ML data structure 140 to store any remaining keys 135.

Turning now to FIG. 2B, a block diagram of an example MLDS index 150 is shown. In the illustrated embodiment, MLDS index 150 includes index entries 260. As further shown, an index entry 260 specifies a marker key 154, a location 156, a key count 270, and index block numbers 280. In some embodiments, MLDS index 150 is implemented differently than shown. For example, an index entry 260 may specify multiple master keys 154.

As mentioned, MLDS index 150 is a data structure having index metadata that enables database node 160 to identify and locate ML data structures 140 that are relevant to answering a key range search or a key range count. In various embodiments, MLDS index 150 is a sorted array (e.g., sorted according to marker keys 154) of index entries 260. In some embodiments, MLDS index 150 is a trie structure, which may be similar to ML data structure 140. In some instances, database node 160 may manage multiple MLDS indexes 150 that form a hierarchy in which an MLDS index 150 may be used to identify and locate other MLDS indexes 150 that identify and locate other MLDS indexes 150 and/or ML data structures 140. An example of a trie hierarchy is discussed in more detail with respect to FIG. 2C.

Marker key 154, in various embodiments, is the start or end key 135 inserted into the ML data structure 140 that corresponds to the marker key's index entry 260. For example, if keys 135 "ABD," "ABC," and "ABE" are inserted into an ML data structure 140, then marker key 154 may specify "ABC," which is the start key 135 according to key-sorted order. In cases in which index entries 260 specify one marker key 154, either all index entries 260 may specify the start key 135 for their corresponding ML data structure 140 or all index entries 260 specify the end key 135. In various embodiments, index entries 260 each include multiple marker key 154 (e.g., the start key 135 and the end key 135 of an ML data structure 140). Accordingly, in some embodiments, an index entry 260 may identify one or more key ranges corresponding to keys 135 inserted into the associated ML data structure 140. In various embodiments, database node 160 uses marker keys 154 to determine which, if any, ML data structures 140 to pull from database 110 into block cache 180. An example of using marker keys 154 is discussed in more detail with respect to FIGS. 4A and 4B.

Location 156, in various embodiments, is a memory address (or another such indicator) that identifies a location of the corresponding ML data structure 140. For example, if database node 160 determines, from an index entry 260, that a particular ML data structure 140 is useful for an in-progress key range lookup, then database node 160 may use that index entry's location value 156 to access the particular ML data structure 140 so that it can be pulled from database 110 into block cache 180. In some instances, location 156 is a memory address that identifies a location of an MLDS index 150 (which may be lower in a trie hierarchy).

Key count 270, in various embodiments, is indicative of the number of keys 135 that have been inserted into the corresponding ML data structure 140. In various embodiments, key count 270 is used by database node 160 in order to answer key range count queries. An example of a key range count is discussed in more detail with respect to FIG. 5.

Index block numbers 280, in various embodiments, identify index blocks within a data index that corresponds to a file 120. An index block may identify the locations in a given file 120 where associated records 130 are stored for corresponding keys 135. That is, in some cases, when searching for a record 130 that corresponds to a search key 135, database node 160 might scan the entire data index in order to identify an index block that correspond to the search key 135. Database node 160 may use the index block to access a fragment portion within a file 120, where that fragment portion stores a set of records 130, one of which may correspond to the search key 135. By storing index block numbers 280 within an index entry 260, if an ML data structure 140 indicates that a file 120 may include a record 130 for a specified key range, then database node 160 may use the corresponding index block numbers 280 to jump directly to the relevant index block(s) instead of having to perform a search of the entire data index. In some embodiments, index block numbers 280 identify a range of index blocks in the data index that database node 160 can access using those index block numbers 280.

Turning now to FIG. 2C, a block diagram of an example hierarchy of ML data structures 140 and MLDS indexes 150 is shown. In the illustrated embodiment, hierarchy 290 includes an MLDS index 150A at a top level 292, two MLDS indexes 150B and 150C at a middle level 294, and multiple ML data structures 140 at a bottom level 296. Also as shown, MLDS index 150 is connected to MLDS indexes 150B and 150C, and MLDS indexes 150B and 150C each connect to a respective set of ML data structures 140. In some embodiments, hierarchy 290 is implemented differently than shown. For example, hierarchy 290 may include another level of MLDS indexes 150.

In some cases, there may be a reasonably large number of ML data structures 140 that are associated with a particular file 120. As a result, the number of corresponding index entries 260 in the associated MLDS index 150 may cause that MLDS index 150 to exceed a particular threshold size (e.g., one cache block). Accordingly, in order to keep MLDS indexes 150 below the particular threshold size, a hierarchy 290 may be generated and used by database node 160. MLDS indexes 150 that point to other MLDS indexes 150 may store index entries 260 having locations 156 that identify memory addresses of those other MLDS indexes 150 instead of ML data structures 140. For example, MLDS index 150A may include two index entries 260: one that points to MLDS index 150B and one that points to MLDS index 150C. MLDS index 150A may also store marker keys 154 for MLDS index 150B and 150C that correspond to the range of keys covered by their corresponding ML data structures 140. Accordingly, when traversing hierarchy 290, database node 160 may determine, from marker keys 154 stored in MLDS index 150A, whether MLDS index 150B or 150C is relevant to a key range search or key range count. Database node 160 may use locations 156 stored in MLDS index 150A to access the relevant MLDS index 150 and then use that MLDS index 150 to access any relevant ML data structures 140. By using hierarchy 290, database node 160 may keep all MLDS indexes 150 and ML data structures 140 under a threshold size (e.g., one cache block). This can reduce the amount of blocks that are pulled into cache block 180 as part of answering a key range query/count.

Figure 3:
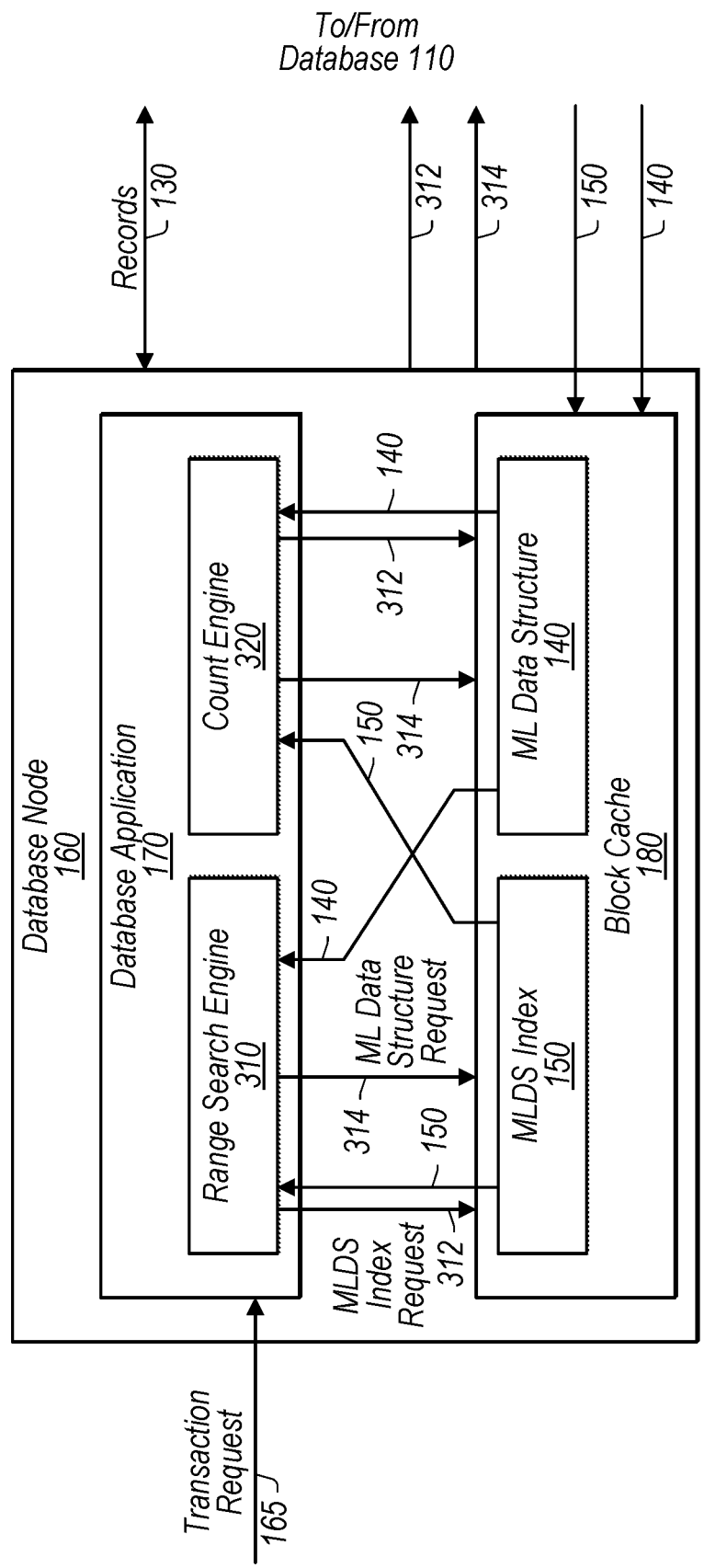
FIG. 3 is a block diagram illustrating example elements of a database node, according to some embodiments.

Turning now to FIG. 3, a block diagram of an example database node 160 is shown. In the illustrated embodiment, database node 160 includes database application 170 and block cache 180. As shown, database application 170 includes a range search engine 310 and a count engine 320, and block cache 180 stores an ML data structure 140 and an MLDS index 150. In some embodiments, database node 160 is implemented differently than shown. As an example, database node 160 may store records 130 in block cache 180.

Range search engine 310, in various embodiments, is a set of software routines that are executable to perform a search of a key 135 or a key range in order to discover records for the key 135 or the key range. As shown, database node 160 receives a transaction request 165. As a part of processing that transaction request 165, database node 160 reads and/or writes records 130 for a key 135 or a key range. When attempting to read records 130 from database 110 for that key 135 or that key range, in various embodiments, database node 160 may initially fetch an MLDS index 150 from database 110 and store it in block cache 180 as illustrated. In various cases, database node 160 may access metadata (not shown) that indicates which file(s) 120 are associated with the key/key range. Database node 160 may then retrieve an MLDS index 150 from the identified file(s) 120. After the MLDS index 150 has been cached in block cache 180, range search engine 310 may issue an MLDS index request 312 to block cache 180 in order to access that MLDS index 150.

After accessing the MLDS index 150, in some embodiments, range search engine 310 performs a search (e.g., a binary search or a LOUDS-oriented search) of that MLDS index 150 to identify the index entry 260 that has the closest marker key 154 that comes before the search key 135 or search key range if marker keys 154 are start keys 135. In the cases in which marker keys 154 are end keys 135, range search engine 310 may identify the index entry 260 that has the closest marker key 154 that comes after the search key/key range. Range search engine 310 may then select the next index entry 260 subsequently following the identified index entry 260 (or the preceding index entry 260 if marker keys 154 are end keys 135). If no index entry 260 includes a marker key 154 that comes before the search key/key range (if marker keys 154 are start keys 135) or comes after the search key/key range (if marker keys 154 are end keys 135), then, in various embodiments, range search engine 310 selects the starting index entry 260 or the last index entry 260 in the MLDS index 150, respectively.

As mentioned, in some embodiments, an MLDS index 150 is implemented as an array of index entries 260. In such embodiments, range search engine 310 may determine whether the marker key 154 that is stored in the selected index entry 260 (e.g., the next index entry 260 following the identified index entry 260, the starting index entry 260, or the ending index entry 260) is equal to the search key 135 or falls within the search key range. If that marker key 154 is equal to the search key 135 or falls within the search key range, then range search engine 310 knows that there is at least one record 130 for the key/key range. Consequently, database node 160 may access records 130 from the corresponding file 120 without accessing any ML data structure 140. In various embodiments, database node 160 uses index block numbers 280 from the identified and selected index entries 260 to more efficiently access those records 130. If the marker key 154 does not fall within the search key range, then range search engine 310 knows that the search key range does not span multiple index entries 260. Accordingly, range search engine 310 may access the initially identified ML data structure 140 (not the next index entry 260 that follows the identified index entry 260) by sending an ML data structure request 314 to block cache 180. After receiving the identified ML data structure 140, range search engine 310 may perform a search of that ML data structure 140 to determine if it includes any keys 135 that falls within the search key range. If there exists at least one key 135, then database node 160 may access records 130 from the corresponding file 120. In various embodiments, key range searches that use an array-based MLDS index 150 involve accessing at most one ML data structure 140. As a result, in many cases, to answer these searches at most two blocks have to be evicted from block cache 180 to make room for an MLDS index 150 and an ML data structure 140.

In some embodiments, an MLDS index 150 is implemented using a data structure that is similar to an ML data structure 140. In such embodiments, marker keys 154 may be inserted into MLDS index 150 in a similar way such that the characters of marker keys 154 are stored in prefix vector 210 and suffix vector 220. The additional information (e.g., location 156, key count 270, etc.) can be stored as augmented information to a suffix character. For example, the suffix portion may be K+8 bytes, where K is the suffix bytes from a marker key 154 and the 8 bytes can be used for location 156, key count 270, and index block numbers 280. If the MLDS index 150 is implemented this way and no ML data structure 140 is identified that is associated with a marker key 154 that comes before the search key/key range, then, range search engine 310 may access the first ML data structure 140 (or the last ML data structure 140 if marker keys 154 are end keys 135) identified by the MLDS index 150. Range search engine 310 may then perform a search of that ML data structures 140 for at least one key matching the search key/key range. If at least one key is identified, then database node 160 may access records 130 from the corresponding file 120. If an ML data structure 140 is identified from a search of the MLDS index 150, then, range search engine 310 may access the identified ML data structure 140 and perform a search of that ML data structures 140. If no key is identified, then range search engine 310 may access the next ML data structure 140 and perform a search of that ML data structure 140. If at least one key is identified, then database node 160 may access records 130 from the corresponding file 120. In various embodiments, key range searches that use this type of MLDS index 150 involve accessing at most two ML data structures 140.

Count engine 320, in various embodiments, is a set of software routines executable to determine an approximate number of keys 135 within a specified key range. Similarly to range search engine 310, count engine 320 may send an MLDS index request 312 to block cache 180 to access a cached MLDS index 150. In various embodiments, count engine 320 performs a search (e.g., a binary search or a LOUDS-oriented search) of that MLDS index 150 to identify two index entries 260: one that has the closest marker key 154 that comes before the start key of the count key range and one that has the closest marker key 154 that comes before the end key of the count key range. If the two index entries 260 are the same entry, then count engine 320 may access the corresponding ML data structure 140 (e.g., from block cache 180 after it has been pulled from database 110 and cached) and count the number of keys 135 inserted into that ML data structure 140 that fall within the count key range. Thereafter, count engine 320 may return the count as answer to a key range count inquiry. If the two index entries 260 are different, then count engine 320 may access the two corresponding ML data structure 140 and count the number of keys 135 inserted into them that fall within the count key range. If there are ML data structures 140 between those two ML data structure 140, then count engine 320 may use add the key counts 270 from the corresponding index entries 260 to the total key count instead of accessing and searching those ML data structures 140. Thereafter, count engine 320 may return the count as answer to a key range count inquiry. An example of a key range count is discussed in more detail with respect to FIG. 5.

Figure 4A:
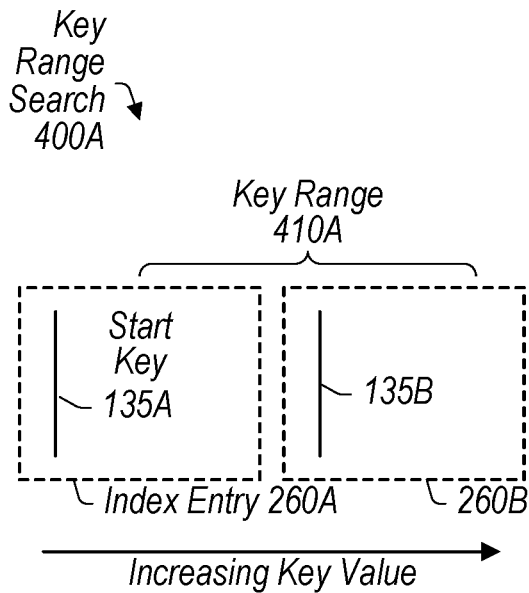
FIGS. 4A-B are block diagrams illustrating example key range searches, according to some embodiments.
Figure 4B:
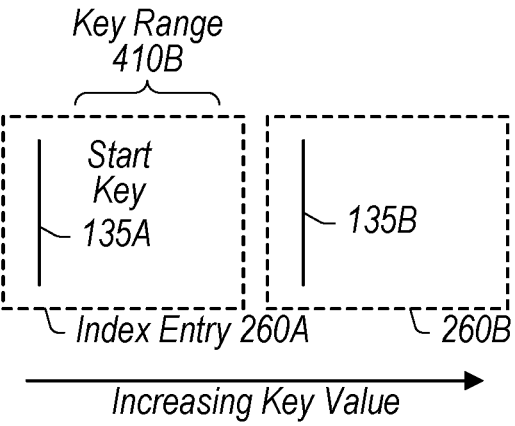

Turning now to FIG. 4A-B, block diagrams of example key range searches are shown. A key range search 400A is depicted that involves a key range 410A that spans index entries 260A and 260B and thus spans two ML data structures 140. (The dashed-line boxes are shown to illustrate the range of keys 135 inserted into the associated ML data structure 140). Initially, range search engine 310 may identify index entry 260A from an MLDS index 150 as its marker key 154 (shown as start key 135A) comes before the start key of key range 410A while being the closest to the start key 135 of key range 410A. Range search engine 310 may then determine whether the marker key 154 of the next index entry 260 (i.e., index entry 260B in the illustrated embodiment) is within key range 410A. As shown, start key 135B (that is, the marker key 154) is within key range 410A. Thus, range search engine 310 knows that there is at least one record 130 for key range 410A (e.g., a record 130 corresponding to start key 135B). As a result, range search engine 310 does not have to pull an ML data structure 140 into block cache 180 so that it can be searched. That is, range search engine 310 can answer whether there exists a record 130 or not for key range 410A without having to use ML data structures 140.

In FIG. 4B, a key range search 400B is shown that involves a key range 410B that does not span index entries 260A and 260B and thus does not span two ML data structures 140. In various embodiments, after identifying index entry 260A (as discussed above) and determining that start key 135B of index entry 260B (which is the next index entry 260 that follows index entry 260A) is not within key range 410B, range search engine 310 pulls the ML data structure 140 corresponding to index entry 260A into block cache 180 using location 156 so that it can be searched. Range search engine 310 may then search that ML data structure 140 to determine if it includes a key 135 within key range 410B. Range search engine 310 may then return an appropriate response. In this example, range search engine 310 can answer whether there exists a record 130 or not for key range 410A by accessing only one ML data structure 140, which provides a tight upper bound on the number of cache blocks accessed to answer a range query existence check.

Figure 5:
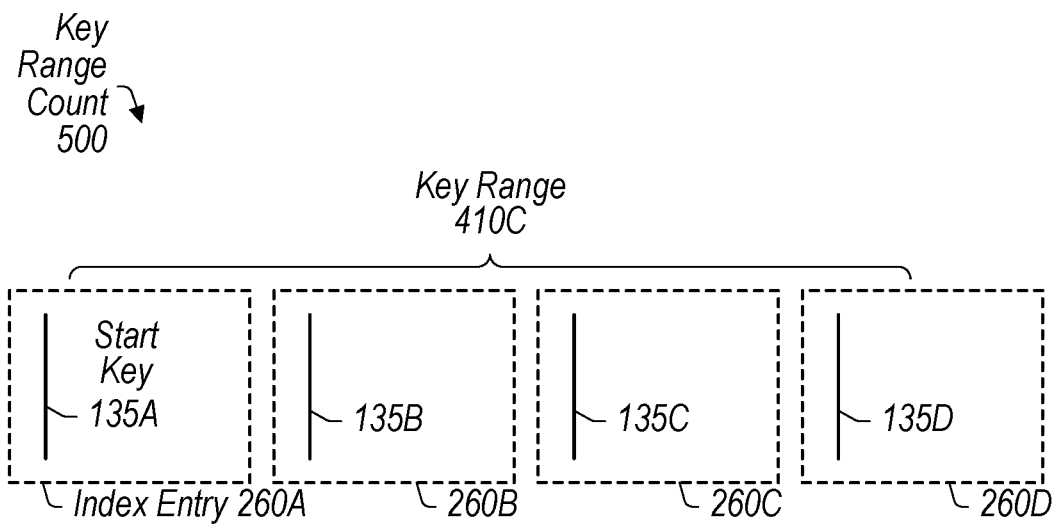
FIG. 5 is a block diagram illustrating an example key range count, according to some embodiments.

Turning now to FIG. 5, a block diagram of an example key range count is shown. A key range count 500 is depicted that involves a key range 410C that spans index entries 260A-D and thus spans four ML data structures 140. (The dashed-line boxes are shown to illustrate the range of keys 135 inserted into the associated ML data structure 140). Initially, count engine 320 may identify index entries 260A and 260D from an MLDS index 150—index entry 260A because its marker key 154 (shown as start key 135A) comes before the start key of key range 410C while also being the closest to the start key 135 of key range 410C, and index entry 260D because its marker key 154 (shown as start key 135A) comes before the end key of key range 410C while being the closest to the end key 135 of key range 410C. Thereafter, count engine 320 may pull the ML data structures 140 corresponding to index entries 260A and 260D into block cache 180. Count engine 320 may then count the number of keys 135 inserted to those two ML data structure 140 that fall within key range 410C. Because all keys 135 inserted into the ML data structures 140 corresponding to index entries 260B and 260C fall within key range 410C, count engine 320 may use the key count 270 of index entries 260B and 260C in order to determine the number of inserted keys 135 instead of fetching the corresponding ML data structures 140. Count engine 320 may then return a total key count as a response to a key count inquiry. In various cases, count engine 320 is able to answer a key count inquiry by accessing at most two cache blocks (e.g., the ML data structures 140 containing the start and end key of a key range).

Figure 6:
FIG. 6 is a flow diagram illustrating example method relating to using multi-level data structures and multi-level data structure indexes, according to some embodiments.

Turning now to FIG. 6, a flow diagram of a method 600 is shown. Method 600 is one embodiment of a method performed by a computer system (e.g., a database node 160) to create and use ML data structures (e.g., ML data structures 140) and index metadata (e.g., an MLDS index 150). Method 600 may be performed by executing a set of program instructions stored on a non-transitory computer-readable medium. In some embodiments, method 600 includes more or less steps than shown. For example, method 600 may include a step in which ML data structures are loaded from a particular region (e.g., a file 120) of a database (e.g., database 110) into a cache (e.g., block cache 180) of the computer system.

Method 600 begins in step 610 with the computer system operating the database, which includes maintaining a set of records (e.g., records 130) that have a set of corresponding keys (e.g., keys 135). In some embodiments, the computer system initially stores records in a local buffer as a part of processing received transaction requests (e.g., transaction requests 165). The computer system may flush those records to files at the database after a certain period of time or once the buffer is relatively full.

In step 620, the computer system creates a plurality of ML data structures that facilitate key range lookups against the set of records. The computer system may store the plurality of ML data structures in the particular region of the database along with the records. A given ML data structure may store key information (e.g., compressed keys 135) indicative of a subset of the corresponding keys. In some embodiments, the computer system computes Rank and Select for the given ML data structure and stores the computed Rank and Select in the given ML data structure to be used for traversing the given ML data structure.

In step 630, the computer system creates separate index metadata usable for accessing ones of the plurality of ML data structures. The index metadata may specify indications of key information that is stored in the plurality of ML data structures and locations (e.g., locations 156) of the plurality of ML data structures. In various embodiments, the indications correspond to marker keys (e.g., marker keys 154) inserted into the plurality of ML data structures. In some cases, the marker keys specify both a start key and an end key for a particular one of the plurality of ML data structures. In various embodiments, the index metadata is a trie structure that forms a part of a first level of a trie hierarchy, and the plurality of ML data structures are a plurality of trie structures that form a part of a second, subsequent level of the trie hierarchy.

In step 640, the computer system performs a key range lookup/search that includes using the index metadata to determine a particular set of the plurality of ML data structures (which may be zero in some cases) whose key information corresponds to a key range of that key range lookup. Using the index metadata may include determining, based on the marker keys, whether the key range of the key range lookup spans at least two of the plurality of ML data structures, such as the example of FIG. 4A. In response to determining that the key range spans at least two of the plurality of ML data structures, the computer system may access one or more of the set of records without accessing the plurality of ML data structures. In response to determining that the key range does not span at least two ML data structures, the computer system may access a particular one of the ML data structures whose marker key satisfies a particular criterion (e.g., is closest to the key range, but less than the key range) relating to the key range. The computer system may determine whether keys identified by the particular ML data structure include at least one key within the key range of the key range lookup.

In some embodiments, the index metadata specifies a plurality of key counts (e.g., key counts 270) for the plurality of ML data structures. A given key count is indicative a number of keys inserted into a corresponding ML data structure. Based on the plurality of key counts, the computer system may identify a number of keys inserted into the plurality of ML data structures that fall within a second key range. Identifying the number of keys may include determining that the second key range is encompassed within a key range derived from keys inserted into a single one of the plurality of ML data structures. Accordingly, the computer system may access the single ML data structure using the index metadata and count keys in the accessed single multi-level data structure to determine the number of keys that fall within the second key range.

In some cases, identifying the number of keys may include determining that the second key range is encompassed within key ranges derived from keys inserted into multiple ones of the plurality of ML data structures. Accordingly, the computer system may access two of the multiple ML data structures using the index metadata and count keys in the two accessed multi-level data structures to determine an initial key count. The computer system may further derive the number of keys that fall within the second key range based on the initial key count and one or more of the plurality of key counts specified in the index metadata that correspond to the other ones of the multiple ML data structures than the two accessed ML data structures.

In some embodiments, the index metadata specifies an indication of a record index block (e.g., index block numbers 280) that stores a pointer to a record block having one or more records. The computer system may access the particular records for the key range lookup by accessing a particular record index block identified by the index metadata and using a pointer stored in the particular record index block to access a particular record block having at least one of the particular records.

Exemplary Multi-Tenant Database System

Figure 7:
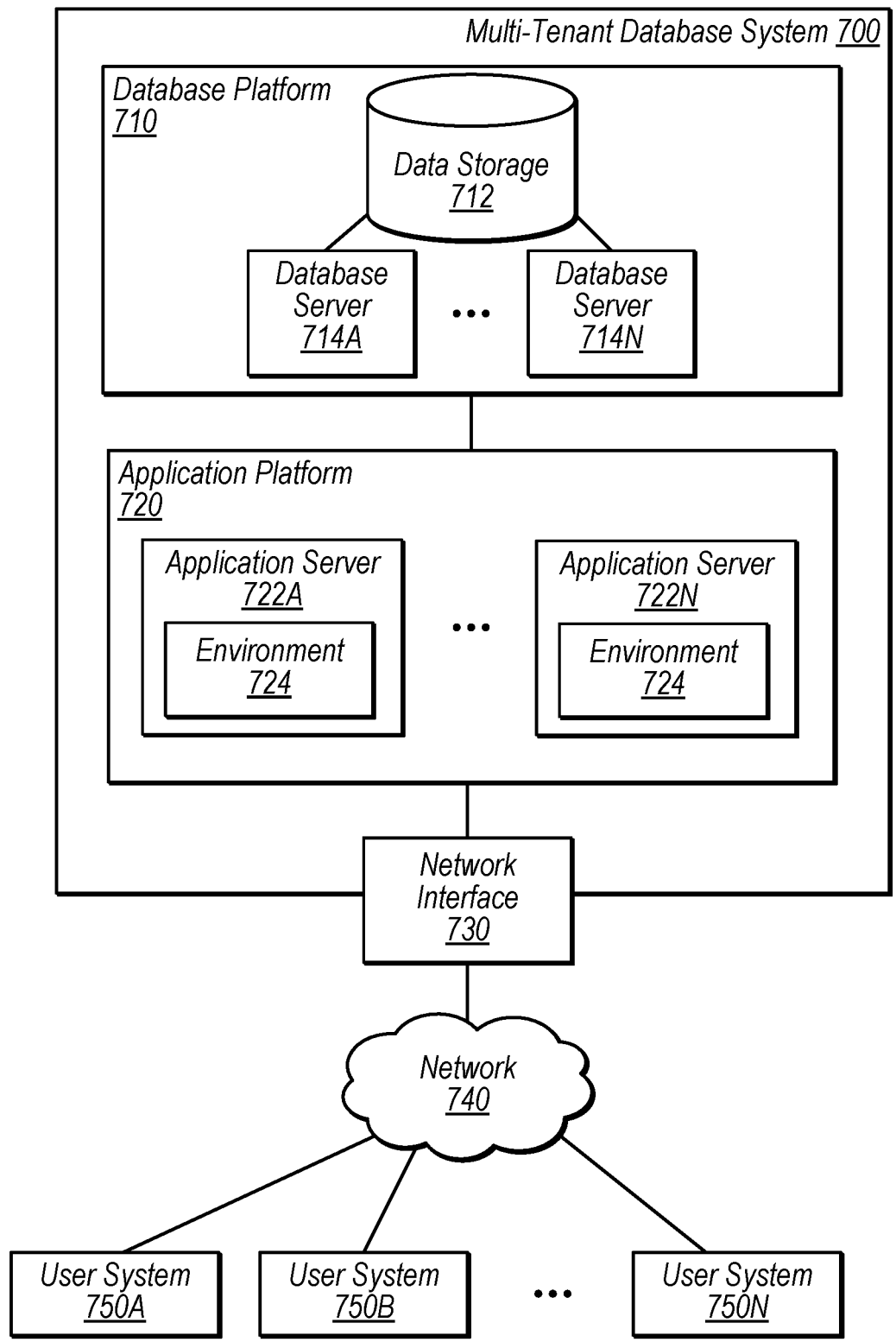
FIG. 7 is a block diagram illustrating elements of a multi-tenant system corresponding to the system described in the present disclosure, according to some embodiments.

Turning now to FIG. 7, an exemplary multi-tenant database system (MTS) 700 in which various techniques of the present disclosure can be implemented is shown—e.g., system 100 may be MTS 700. In FIG. 7, MTS 700 includes a database platform 710, an application platform 720, and a network interface 730 connected to a network 740. Also as shown, database platform 710 includes a data storage 712 and a set of database servers 714A-N that interact with data storage 712, and application platform 720 includes a set of application servers 722A-N having respective environments 724. In the illustrated embodiment, MTS 700 is connected to various user systems 750A-N through network 740. The disclosed multi-tenant system is included for illustrative purposes and is not intended to limit the scope of the present disclosure. In other embodiments, techniques of this disclosure are implemented in non-multi-tenant environments such as client/server environments, cloud computing environments, clustered computers, etc.

MTS 700, in various embodiments, is a set of computer systems that together provide various services to users (alternatively referred to as "tenants") that interact with MTS 700. In some embodiments, MTS 700 implements a customer relationship management (CRM) system that provides mechanism for tenants (e.g., companies, government bodies, etc.) to manage their relationships and interactions with customers and potential customers. For example, MTS 700 might enable tenants to store customer contact information (e.g., a customer's website, email address, telephone number, and social media data), identify sales opportunities, record service issues, and manage marketing campaigns. Furthermore, MTS 700 may enable those tenants to identify how customers have been communicated with, what the customers have bought, when the customers last purchased items, and what the customers paid. To provide the services of a CRM system and/or other services, as shown, MTS 700 includes a database platform 710 and an application platform 720.

Database platform 710, in various embodiments, is a combination of hardware elements and software routines that implement database services for storing and managing data of MTS 700, including tenant data. As shown, database platform 710 includes data storage 712. Data storage 712, in various embodiments, includes a set of storage devices (e.g., solid state drives, hard disk drives, etc.) that are connected together on a network (e.g., a storage attached network (SAN)) and configured to redundantly store data to prevent data loss. In various embodiments, data storage 712 is used to implement a database (e.g., database 110) comprising a collection of information that is organized in a way that allows for access, storage, and manipulation of the information. Data storage 712 may implement a single database, a distributed database, a collection of distributed databases, a database with redundant online or offline backups or other redundancies, etc. As part of implementing the database, data storage 712 may store files (e.g., files 120) that include one or more database records having respective data payloads (e.g., values for fields of a database table) and metadata (e.g., a key value, timestamp, table identifier of the table associated with the record, tenant identifier of the tenant associated with the record, etc.).

In various embodiments, a database record may correspond to a row of a table. A table generally contains one or more data categories that are logically arranged as columns or fields in a viewable schema. Accordingly, each record of a table may contain an instance of data for each category defined by the fields. For example, a database may include a table that describes a customer with fields for basic contact information such as name, address, phone number, fax number, etc. A record therefore for that table may include a value for each of the fields (e.g., a name for the name field) in the table. Another table might describe a purchase order, including fields for information such as customer, product, sale price, date, etc. In various embodiments, standard entity tables are provided for use by all tenants, such as tables for account, contact, lead and opportunity data, each containing pre-defined fields. MTS 700 may store, in the same table, database records for one or more tenants—that is, tenants may share a table. Accordingly, database records, in various embodiments, include a tenant identifier that indicates the owner of a database record. As a result, the data of one tenant is kept secure and separate from that of other tenants so that that one tenant does not have access to another tenant's data, unless such data is expressly shared.

In some embodiments, the data stored at data storage 712 is organized as part of a log-structured merge-tree (LSM tree). An LSM tree normally includes two high-level components: an in-memory buffer and a persistent storage. In operation, a database server 714 may initially write database records into a local in-memory buffer before later flushing those records to the persistent storage (e.g., data storage 712). As part of flushing database records, the database server 714 may write the database records into new files that are included in a "top" level of the LSM tree. Over time, the database records may be rewritten by database servers 714 into new files included in lower levels as the database records are moved down the levels of the LSM tree. In various implementations, as database records age and are moved down the LSM tree, they are moved to slower and slower storage devices (e.g., from a solid state drive to a hard disk drive) of data storage 712.

When a database server 714 wishes to access a database record for a particular key, the database server 714 may traverse the different levels of the LSM tree for files that potentially include a database record for that particular key.

If the database server 714 determines that a file may include a relevant database record, the database server 714 may fetch the file from data storage 712 into a memory of the database server 714. The database server 714 may then check the fetched file for a database record having the particular key. In various embodiments, database records are immutable once written to data storage 712. Accordingly, if the database server 714 wishes to modify the value of a row of a table (which may be identified from the accessed database record), the database server 714 writes out a new database record to the top level of the LSM tree. Over time, that database record is merged down the levels of the LSM tree. Accordingly, the LSM tree may store various database records for a database key where the older database records for that key are located in lower levels of the LSM tree then newer database records.

Database servers 714, in various embodiments, are hardware elements, software routines, or a combination thereof capable of providing database services, such as data storage, data retrieval, and/or data manipulation. A database server 714 may correspond to database node 160. Such database services may be provided by database servers 714 to components (e.g., application servers 722) within MTS 700 and to components external to MTS 700. As an example, a database server 714 may receive a database transaction request from an application server 722 that is requesting data to be written to or read from data storage 712. The database transaction request may specify an SQL SELECT command to select one or more rows from one or more database tables. The contents of a row may be defined in a database record and thus database server 714 may locate and return one or more database records that correspond to the selected one or more table rows. In various cases, the database transaction request may instruct database server 714 to write one or more database records for the LSM tree—database servers 714 maintain the LSM tree implemented on database platform 710. In some embodiments, database servers 714 implement a relational database management system (RDMS) or object oriented database management system (OODBMS) that facilitates storage and retrieval of information against data storage 712. In various cases, database servers 714 may communicate with each other to facilitate the processing of transactions. For example, database server 714A may communicate with database server 714N to determine if database server 714N has written a database record into its in-memory buffer for a particular key.

Application platform 720, in various embodiments, is a combination of hardware elements and software routines that implement and execute CRM software applications as well as provide related data, code, forms, web pages and other information to and from user systems 750 and store related data, objects, web page content, and other tenant information via database platform 710. In order to facilitate these services, in various embodiments, application platform 720 communicates with database platform 710 to store, access, and manipulate data. In some instances, application platform 720 may communicate with database platform 710 via different network connections. For example, one application server 722 may be coupled via a local area network and another application server 722 may be coupled via a direct network link. Transfer Control Protocol and Internet Protocol (TCP/IP) are exemplary protocols for communicating between application platform 720 and database platform 710, however, it will be apparent to those skilled in the art that other transport protocols may be used depending on the network interconnect used.

Application servers 722, in various embodiments, are hardware elements, software routines, or a combination thereof capable of providing services of application platform 720, including processing requests received from tenants of MTS 700. Application servers 722, in various embodiments, can spawn environments 724 that are usable for various purposes, such as providing functionality for developers to develop, execute, and manage applications (e.g., business logic). Data may be transferred into an environment 724 from another environment 724 and/or from database platform 710. In some cases, environments 724 cannot access data from other environments 724 unless such data is expressly shared. In some embodiments, multiple environments 724 can be associated with a single tenant.

Application platform 720 may provide user systems 750 access to multiple, different hosted (standard and/or custom) applications, including a CRM application and/or applications developed by tenants. In various embodiments, application platform 720 may manage creation of the applications, testing of the applications, storage of the applications into database objects at data storage 712, execution of the applications in an environment 724 (e.g., a virtual machine of a process space), or any combination thereof. In some embodiments, application platform 720 may add and remove application servers 722 from a server pool at any time for any reason, there may be no server affinity for a user and/or organization to a specific application server 722. In some embodiments, an interface system (not shown) implementing a load balancing function (e.g., an F5 Big-IP load balancer) is located between the application servers 722 and the user systems 750 and is configured to distribute requests to the application servers 722. In some embodiments, the load balancer uses a least connections algorithm to route user requests to the application servers 722. Other examples of load balancing algorithms, such as are round robin and observed response time, also can be used. For example, in certain embodiments, three consecutive requests from the same user could hit three different servers 722, and three requests from different users could hit the same server 722.

In some embodiments, MTS 700 provides security mechanisms, such as encryption, to keep each tenant's data separate unless the data is shared. If more than one server 714 or 722 is used, they may be located in close proximity to one another (e.g., in a server farm located in a single building or campus), or they may be distributed at locations remote from one another (e.g., one or more servers 714 located in city A and one or more servers 722 located in city B). Accordingly, MTS 700 may include one or more logically and/or physically connected servers distributed locally or across one or more geographic locations.

One or more users (e.g., via user systems 750) may interact with MTS 700 via network 740. User system 750 may correspond to, for example, a tenant of MTS 700, a provider (e.g., an administrator) of MTS 700, or a third party. Each user system 750 may be a desktop personal computer, workstation, laptop, PDA, cell phone, or any Wireless Access Protocol (WAP) enabled device or any other computing device capable of interfacing directly or indirectly to the Internet or other network connection. User system 750 may include dedicated hardware configured to interface with MTS 700 over network 740. User system 750 may execute a graphical user interface (GUI) corresponding to MTS 700, an HTTP client (e.g., a browsing program, such as Microsoft's Internet Explorer™ browser, Netscape's Navigator™ browser, Opera's browser, or a WAP-enabled browser in the case of a cell phone, PDA or other wireless device, or the like), or both, allowing a user (e.g., subscriber of a CRM system) of user system 750 to access, process, and view information and pages available to it from MTS 700 over network 740. Each user system 750 may include one or more user interface devices, such as a keyboard, a mouse, touch screen, pen or the like, for interacting with a graphical user interface (GUI) provided by the browser on a display monitor screen, LCD display, etc. in conjunction with pages, forms and other information provided by MTS 700 or other systems or servers. As discussed above, disclosed embodiments are suitable for use with the Internet, which refers to a specific global internetwork of networks. It should be understood, however, that other networks may be used instead of the Internet, such as an intranet, an extranet, a virtual private network (VPN), a non-TCP/IP based network, any LAN or WAN or the like.

Because the users of user systems 750 may be users in differing capacities, the capacity of a particular user system 750 might be determined one or more permission levels associated with the current user. For example, when a salesperson is using a particular user system 750 to interact with MTS 700, that user system 750 may have capacities (e.g., user privileges) allotted to that salesperson. But when an administrator is using the same user system 750 to interact with MTS 700, the user system 750 may have capacities (e.g., administrative privileges) allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level. There may also be some data structures managed by MTS 700 that are allocated at the tenant level while other data structures are managed at the user level.

In some embodiments, a user system 750 and its components are configurable using applications, such as a browser, that include computer code executable on one or more processing elements. Similarly, in some embodiments, MTS 700 (and additional instances of MTSs, where more than one is present) and their components are operator configurable using application(s) that include computer code executable on processing elements. Thus, various operations described herein may be performed by executing program instructions stored on a non-transitory computer-readable medium and executed by processing elements. The program instructions may be stored on a non-volatile medium such as a hard disk, or may be stored in any other volatile or non-volatile memory medium or device as is well known, such as a ROM or RAM, or provided on any media capable of staring program code, such as a compact disk (CD) medium, digital versatile disk (DVD) medium, a floppy disk, and the like. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the disclosed embodiments can be implemented in any programming language that can be executed on a server or server system such as, for example, in C, C+, HTML, Java, JavaScript, or any other scripting language, such as VB Script.

Network 740 may be a LAN (local area network), WAN (wide area network), wireless network, point-to-point network, star network, token ring network, hub network, or any other appropriate configuration. The global internetwork of networks, often referred to as the "Internet" with a capital "I," is one example of a TCP/IP (Transfer Control Protocol and Internet Protocol) network. It should be understood, however, that the disclosed embodiments may utilize any of various other types of networks.

User systems 750 may communicate with MTS 700 using TCP/IP and, at a higher network level, use other common Internet protocols to communicate, such as HTTP, FTP, AFS, WAP, etc. For example, where HTTP is used, user system 750 might include an HTTP client commonly referred to as a "browser" for sending and receiving HTTP messages from an HTTP server at MTS 700. Such a server might be implemented as the sole network interface between MTS 700 and network 740, but other techniques might be used as well or instead. In some implementations, the interface between MTS 700 and network 740 includes load sharing functionality, such as round-robin HTTP request distributors to balance loads and distribute incoming HTTP requests evenly over a plurality of servers.

In various embodiments, user systems 750 communicate with application servers 722 to request and update system-level and tenant-level data from MTS 700 that may require one or more queries to data storage 712. In some embodiments, MTS 700 automatically generates one or more SQL statements (the SQL query) designed to access the desired information. In some cases, user systems 750 may generate requests having a specific format corresponding to at least a portion of MTS 700. As an example, user systems 750 may request to move data objects into a particular environment 724 using an object notation that describes an object relationship mapping (e.g., a JavaScript object notation mapping) of the specified plurality of objects.

Exemplary Computer System

Figure 8:
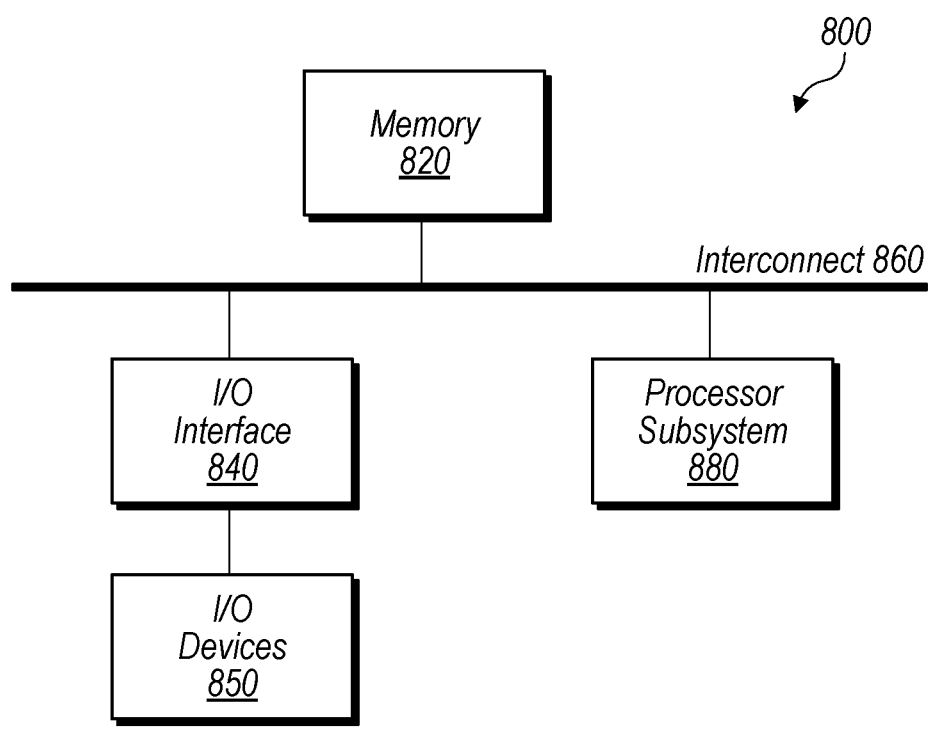
FIG. 8 is a block diagram illustrating elements of a computer system for implementing various systems described in the present disclosure.

Turning now to FIG. 8, a block diagram of an exemplary computer system 800, which may implement system 100, database 110, database node 160, MTS 700, and/or user system 750, is depicted. Computer system 800 includes a processor subsystem 880 that is coupled to a system memory 820 and I/O interfaces(s) 840 via an interconnect 860 (e.g., a system bus). I/O interface(s) 840 is coupled to one or more I/O devices 850. Although a single computer system 800 is shown in FIG. 8 for convenience, system 800 may also be implemented as two or more computer systems operating together.

Processor subsystem 880 may include one or more processors or processing units. In various embodiments of computer system 800, multiple instances of processor subsystem 880 may be coupled to interconnect 860. In various embodiments, processor subsystem 880 (or each processor unit within 880) may contain a cache or other form of on-board memory.

System memory 820 is usable store program instructions executable by processor subsystem 880 to cause system 800 perform various operations described herein. System memory 820 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 800 is not limited to primary storage such as memory 820. Rather, computer system 800 may also include other forms of storage such as cache memory in processor subsystem 880 and secondary storage on I/O Devices 850 (e.g., a hard drive, storage array, etc.). In some embodiments, these other forms of storage may also store program instructions executable by processor subsystem 880. In some embodiments, program instructions that when executed implement range search engine 310 and count engine 320 may be included/stored within system memory 820.

I/O interfaces 840 may be any of various types of interfaces configured to couple to and communicate with other devices, according to various embodiments. In one embodiment, I/O interface 840 is a bridge chip (e.g., Southbridge) from a front-side to one or more back-side buses. I/O interfaces 840 may be coupled to one or more I/O devices 850 via one or more corresponding buses or other interfaces. Examples of I/O devices 850 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 800 is coupled to a network via a network interface device 850 (e.g., configured to communicate over WiFi, Bluetooth, Ethernet, etc.).

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3)

both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(*f*) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement, The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. A method, comprising:
   storing, by a computer system, a set of records having a set of corresponding keys;
   creating, by the computer system, a plurality of multi-level data structures that facilitate key range lookups against the set of records, wherein a given multi-level data structure stores key information indicative of a subset of the corresponding keys and is usable to determine that records corresponding to the subset of keys are stored by the computer system;
   creating, by the computer system, index metadata that is usable for accessing the plurality of multi-level data structures, wherein the index metadata specifies, for the given multi-level data structure:
      a marker key corresponding to one of the subset of keys that was inserted into the given multi-level data structure; and
      a location of the given multi-level data structure;
   wherein the index metadata identifies a portion of a record index that stores a pointer to a location having at least one record; and
   performing, by the computer system, a key range lookup for a particular key range that encompasses multiple keys, wherein the performing includes accessing one or more of the set of records for the particular key range without accessing the plurality of multi-level data structures in response to determining that there is at least one record within the particular key range based on the index metadata indicating that at least a portion of the particular key range falls within at least two multi-level data structures, wherein the accessing of the one or more records includes accessing the at least one record using the pointer stored in the record index.

2. The method of claim 1, wherein the index metadata specifies a plurality of key counts for the plurality of multi-level data structures, wherein a given key count is indicative of a number of keys inserted into a corresponding multi-level data structure, and wherein the method further comprises:
   based on the plurality of key counts, the computer system identifying a number of keys inserted into the plurality of multi-level data structures that fall within a second key range.

3. The method of claim 2, wherein identifying the number of keys includes:
   determining that the second key range is encompassed in a key range derived from keys inserted into a single one of the plurality of multi-level data structures;
   accessing the single multi-level data structure using the index metadata; and
   counting keys in the accessed single multi-level data structure to determine the number of keys that fall within the second key range.

4. The method of claim 2, wherein identifying the number of keys includes:
   determining that the second key range is encompassed in key ranges derived from keys inserted into multiple ones of the plurality of multi-level data structures;
   accessing two of the multiple multi-level data structures using the index metadata;
   counting keys in the two accessed multi-level data structures to determine an initial key count; and
   deriving the number of keys that fall within the second key range based on the initial key count and one or more of the plurality of key counts specified in the index metadata that correspond to the other ones of the multiple multi-level data structures than the two accessed multi-level data structures.

5. The method of claim 1, wherein the portion is a record index block of the record index, and wherein the accessing of the at least one record includes:

accessing the record index block identified by the index metadata; and accessing the at least one record using the pointer stored in the record index block.

6. The method of claim 1, wherein the index metadata is a trie structure that forms a part of a top level of a trie hierarchy, and wherein the plurality of multi-level data structures are a plurality of trie structures that form a bottom level of the trie hierarchy.

7. The method of claim 6, further comprising:

storing, by the computer system, additional index metadata in a plurality of trie structures that form a middle level of the trie hierarchy, wherein the plurality of multi-level data structures are accessible by traversing the trie hierarchy via the additional index metadata.

8. A non-transitory computer readable medium having program instructions stored thereon that are capable of causing a computer system to perform operations comprising:

storing a set of records having a set of corresponding keys;

creating a plurality of multi-level data structures that facilitate key range lookups against the set of records, wherein a given multi-level data structure stores key information indicative of a subset of the corresponding keys and is usable to determine that records corresponding to the subset of keys are stored by the computer system;

creating index metadata that is usable for accessing the plurality of multi-level data structures, wherein the index metadata specifies, for the given multi-level data structure:

a marker key corresponding to one of the subset of keys that was inserted into the given multi-level data structure; and a location of the given multi-level data structure;

wherein the index metadata identifies a portion of a record index that stores a pointer to a location having at least one record; and performing a key range lookup for a particular key range that encompasses multiple keys, wherein the performing includes accessing one or more of the set of records for the particular key range without accessing the plurality of multi-level data structures in response to determining that there is at least one record within the particular key range based on the index metadata indicating that at least a portion of the particular key range falls within at least two multi-level data structures, wherein the accessing of the one or more records includes accessing the at least one record using the pointer stored in the record index.

9. The medium of claim 8, wherein the index metadata includes an entry that identifies, for the given multi-level data structure, the marker key, the location, a key count, and one or more index block numbers usable to access index blocks having pointers to record blocks that store records corresponding to the subset of keys inserted into the given multi-level data structure.

10. The medium of claim 9, wherein the operations further comprise:

performing a key count for the particular key range, including:

determining that a key range of the given multi-level data structure is within the particular key range of the key range lookup; and deriving a total key count for the particular key range based on the key count specified in the index metadata without accessing the given multi-level data structure to count keys of the given multi-level data structure.

11. A system, comprising:

at least one processor; and memory having program instructions stored thereon that are executable by the at least one processor to cause the system to perform operations comprising storing a set of records having a set of corresponding keys;

creating a plurality of multi-level data structures that facilitate key range lookups against the set of records, wherein a given multi-level data structure stores key information indicative of a subset of the corresponding keys and is usable to determine that records corresponding to the subset of keys are stored by the system;

creating index metadata that is usable for accessing the plurality of multi-level data structures, wherein the index metadata specifies, for the given multi-level data structure:

a marker key corresponding to one of the subset of keys that was inserted into the given multi-level data structure; and a location of the given multi-level data structure;

wherein the index metadata identifies a portion of a record index that stores a pointer to a location having at least one record; and performing a key range lookup for a particular key range that encompasses multiple keys, wherein the performing includes accessing one or more of the set of records for the particular key range without accessing the plurality of multi-level data structures in response to determining that there is at least one record within the particular key range based on the index metadata indicating that at least a portion of the particular key range falls within at least two multi-level data structures, wherein the accessing of the one or more records includes accessing the at least one record using the pointer stored in the record index.

12. The system of claim 11, wherein the marker key corresponds to a start key of the given multi-level data structure, and wherein the index metadata further specifies an end key for the given multi-level data structure.

13. The system of claim 11, wherein creating the given multi-level data structure includes:

computing rank and select values for the given multi-level data structure; and storing the computed rank and select values in the given multi-level data structure to be used for traversing the given multi-level data structure.

14. The system of claim 11, wherein the set of records are maintained in a particular region of a database, and wherein the operations further comprise:

storing the plurality of multi-level data structures in the particular region.

* * * * *